(12) United States Patent
Aizawa

(10) Patent No.: US 9,967,447 B2
(45) Date of Patent: May 8, 2018

(54) INFORMATION PROCESSING SYSTEM, HANDHELD APPARATUS, CONTROL METHOD, AND COMPUTER-READABLE STORAGE MEDIUM

(71) Applicant: CANON KABUSHIKI KAISHA, Tokyo (JP)

(72) Inventor: Takashi Aizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/216,205

(22) Filed: Jul. 21, 2016

(65) Prior Publication Data

US 2017/0034417 A1 Feb. 2, 2017

(30) Foreign Application Priority Data

Jul. 28, 2015 (JP) ................................ 2015-148751

(51) Int. Cl.
*H04N 5/225* (2006.01)
*H04N 5/232* (2006.01)

(52) U.S. Cl.
CPC ..... *H04N 5/23206* (2013.01); *H04N 5/23241* (2013.01); *H04N 5/23245* (2013.01); *H04N 5/23293* (2013.01)

(58) Field of Classification Search
CPC .......... H04N 5/23206; H04N 5/23241; H04N 5/23293; H04N 5/23245
USPC ................... 348/222.1, 207.1, 207.2, 207.11
See application file for complete search history.

(56) References Cited

U.S. PATENT DOCUMENTS

| 7,535,490 | B2 | 5/2009 | Aizawa ................... 348/207.11 |
| 8,280,975 | B2 | 10/2012 | Hara et al. ..................... 709/216 |
| 9,380,199 | B2 | 6/2016 | Yoshida et al. ..... H04N 5/23206 |
| 2013/0235234 | A1* | 9/2013 | Cucci ................. H04N 5/23206 348/231.99 |
| 2015/0140988 | A1* | 5/2015 | Kim ....................... H04W 4/18 455/418 |

FOREIGN PATENT DOCUMENTS

JP 2014-053702 3/2014

* cited by examiner

*Primary Examiner* — Yogesh Aggarwal
(74) *Attorney, Agent, or Firm* — Fitzpatrick, Cella, Harper & Scinto

(57) ABSTRACT

An information processing system of this invention includes an image pickup apparatus, a handheld apparatus, and a wearable apparatus. The image pickup apparatus receives a pickup instruction from the handheld apparatus, executes image pickup processing in response to the pickup instruction, and transmits event information about the image pickup processing to the handheld apparatus. The handheld apparatus transmits the pickup instruction to the image pickup apparatus, sets one of a plurality of operation modes to operate in accordance with the set operation mode, receives the event information from the image pickup apparatus, selectively transfers the event information to the wearable apparatus, and executes processing corresponding to the event information if the event information is not transferred to the wearable apparatus. The wearable apparatus receives the event information from the handheld apparatus, and executes processing corresponding to the event information if the event information is received.

22 Claims, 12 Drawing Sheets

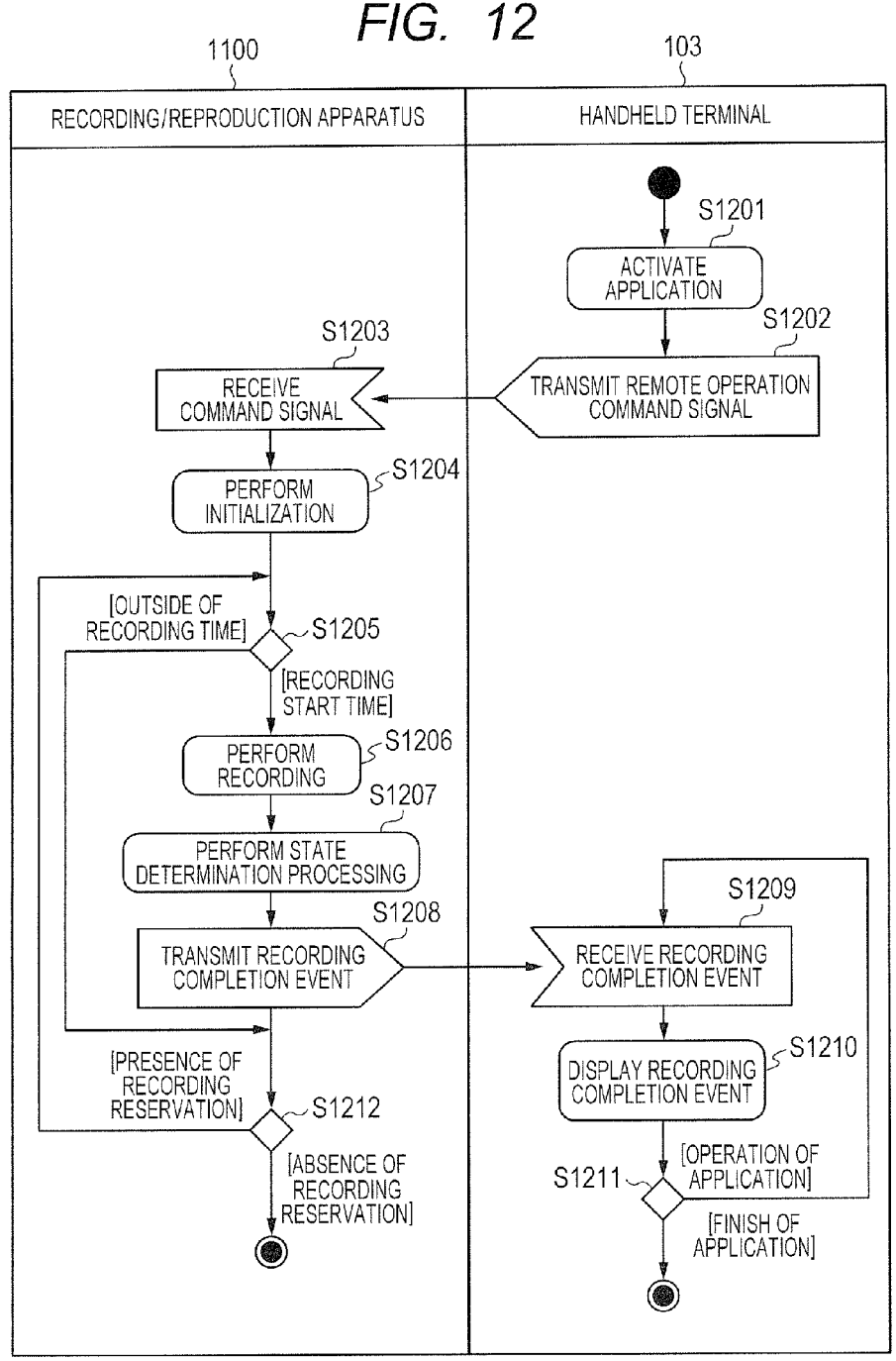

INFORMATION PROCESSING SYSTEM, HANDHELD APPARATUS, CONTROL METHOD, AND COMPUTER-READABLE STORAGE MEDIUM

BACKGROUND OF THE INVENTION

Field of the Invention

The present invention relates to an information processing system in which wireless communication is performed between a plurality of terminals.

Description of the Related Art

In recent years, there has been proposed a wearable terminal having a wireless communication function, such as a smartwatch worn by a user. Furthermore, there has been developed a handheld terminal having a wireless communication function, such as a smartphone which can be carried by a user. There have also been developed many information providing terminals having a wireless communication function, such as a digital camera. Since these terminals are different in terms of the communication capability, display capability, information processing capability, executable functions, and the like, the user uses these terminals depending on the use purpose and use place. For example, the user can confirm an email reception notification by a smartwatch, browse email by a smartphone, and generate, by a digital camera, an image file to be transmitted by email.

Communication is performed between a plurality of terminals, a content is transmitted/received, and target processing is executed for the content in a desired terminal (see Japanese Patent Application Laid-Open No. 2014-53702). According to Japanese Patent Application Laid-Open No. 2014-53702, a digital camera transmits an image file to a smartphone in response to a request from the smartphone, and the image is displayed on the display unit of the smartphone.

If the user has a plurality of different kinds of terminals, a usable terminal may be different depending on the use situation of the user. The functional capabilities of the respective terminals may be different, and thus the user needs to use the terminals in accordance with the use purpose. This is cumbersome for the user.

SUMMARY OF THE INVENTION

The present invention provides an information processing system capable of providing information in an easy-to-understand manner in accordance with the use situation of the user without bothering him/her.

To solve the above problem, according to the present invention, there is provided an information processing system comprising an image pickup apparatus, a handheld apparatus wirelessly communicable with the image pickup apparatus, and a wearable apparatus wirelessly communicable with the handheld apparatus, wherein the image pickup apparatus comprising; a processor, and a memory storing a program which, when executed by the processor, causes the image pickup apparatus to: receive a pickup instruction from the handheld apparatus, execute image pickup processing in response to the pickup instruction, and transmit event information about the image pickup processing to the handheld apparatus, and wherein the handheld apparatus comprising; a processor; and a memory storing a program which, when executed by the processor, causes the image handheld apparatus to: transmit the pickup instruction to the image pickup apparatus, set one of a plurality of operation modes to operate in accordance with the set operation mode, receive the event information from the image pickup apparatus, selectively transfer the event information to the wearable apparatus in accordance with the set operation mode at the time of receiving the event information, and execute processing corresponding to the event information if the event information is not transferred to the wearable apparatus, and wherein the wearable apparatus comprising, a processor; and a memory storing a program which, when executed by the processor, causes the image wearable apparatus to: receive the event information from the handheld apparatus, and execute processing corresponding to the event information if the event information is received.

Further features of the present invention will become apparent from the following description of exemplary embodiments with reference to the attached drawings.

BRIEF DESCRIPTION OF THE DRAWINGS

FIG. 12 is an activity chart showing processing in an information processing system according to the sixth embodiment of the present invention.

DESCRIPTION OF THE EMBODIMENTS

Embodiments for carrying out the present invention will be described in detail below with reference to the accompanying drawings. Note that the following embodiments are merely examples for implementing the present invention and can be appropriately modified or changed depending on various conditions and arrangements of apparatuses to which the present invention is applied. Furthermore, the embodiments can be combined appropriately.

First Embodiment

Figure 1A:
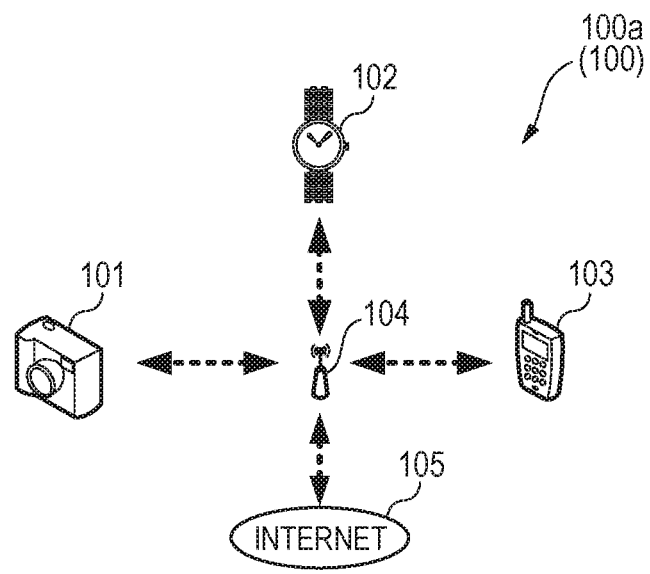
FIGS. 1A and 1B are views each showing the system configuration of an information processing system according to the first embodiment of the present invention.
Figure 1B:
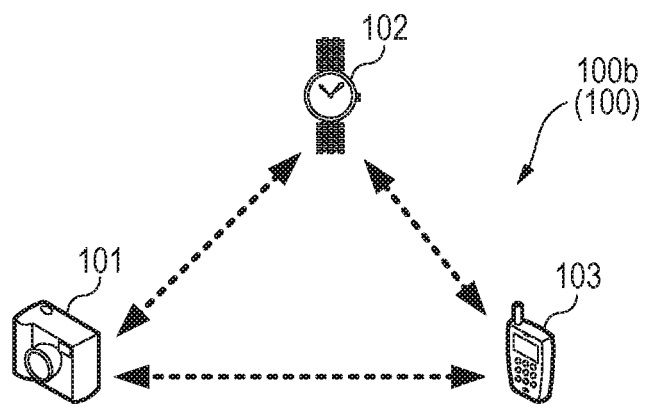

An information processing system 100 according to this embodiment will be described with reference to FIGS. 1A and 1B. FIGS. 1A and 1B are schematic views each showing the information processing system 100 according to this embodiment. FIG. 1A is a schematic view showing the connection state of respective devices according to this embodiment. An information processing system 100a includes a digital camera 101 serving as an information terminal, a wearable terminal 102 serving as the first communication apparatus, and a handheld terminal 103 serving as the second communication apparatus. The digital camera 101, wearable terminal 102, and handheld terminal 103 are connected to be wirelessly communicable via an access point 104. In the arrangement shown in FIG. 1A, communication among the digital camera 101, the wearable terminal 102, and the handheld terminal 103 is implemented by wireless LAN connection of Wi-Fi. FIG. 1A shows a connection form in a so-called infrastructure mode in which each device joins an SSID (Service Set Identifier) generated by the access point 104. Since the access point 104 has a router function, and is connected to the external Internet 105, the digital camera 101, wearable terminal 102, and handheld terminal 103 can also be connected to the external Internet 105.

FIG. 1B is a schematic view showing another connection state in an information processing system 100b according to this embodiment. The digital camera 101, wearable terminal 102, and handheld terminal 103 are directly, wirelessly connected. Communication among the digital camera 101, wearable terminal 102, and handheld terminal 103 is implemented by wireless LAN connection of Wi-Fi. In the example shown in FIG. 1B, a wireless connection between the respective devices is established by connection in a so-called ad hoc mode in which the respective devices are directly connected. The digital camera 101, wearable terminal 102, or handheld terminal 103 has the function of an access point, and individually generates an SSID, and the remaining devices join the SSID, thereby establishing a wireless connection.

Figure 2A:
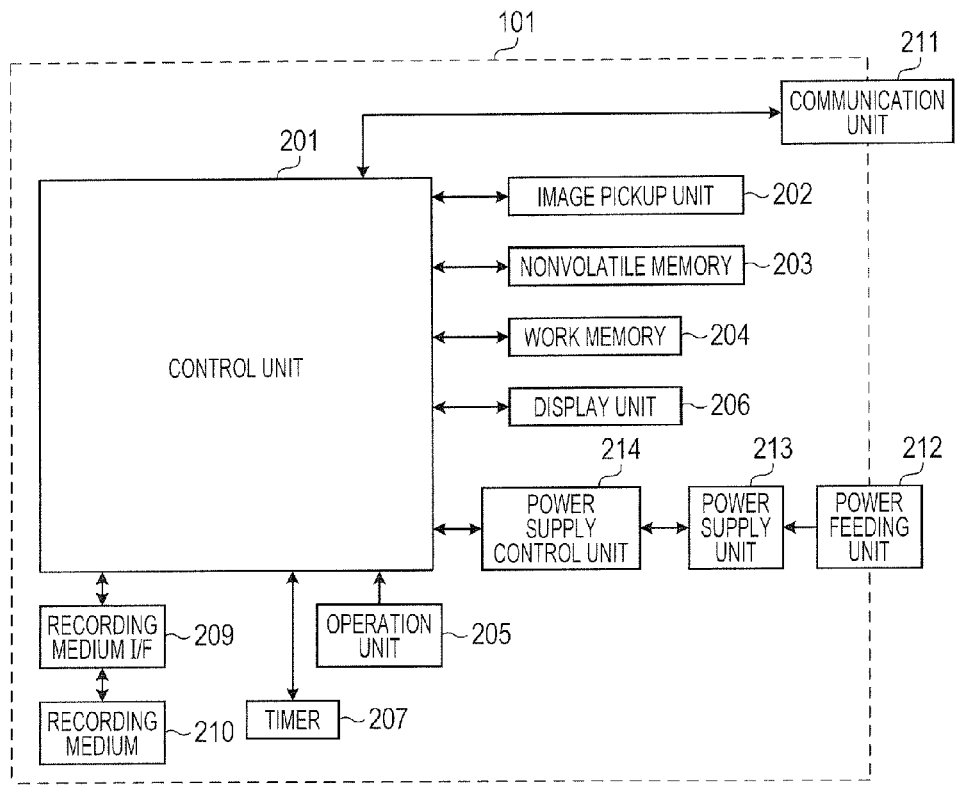
FIGS. 2A, 2B and 2C are a block diagram and perspective views, respectively, showing the hardware arrangement of a digital camera according to the first embodiment of the present invention.
Figure 2B:
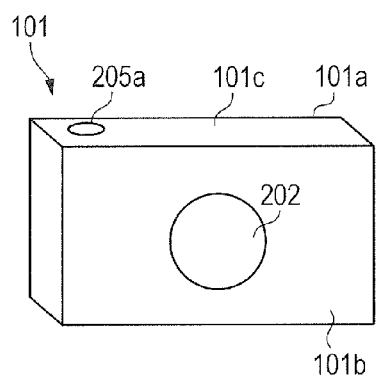
Figure 2C:
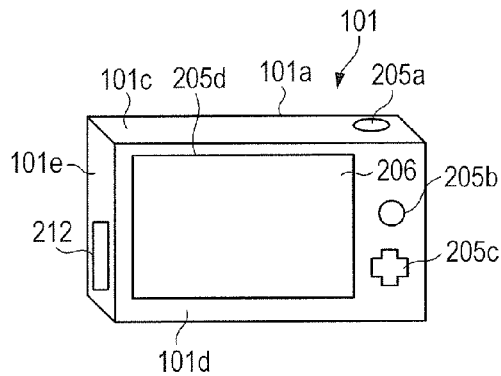

FIGS. 2A to 2C are a block diagram and perspective views, respectively, showing the hardware arrangement of the digital camera 101 according to the embodiment of the present invention. FIG. 2A is a block diagram showing the hardware arrangement of the digital camera 101 according to this embodiment. FIGS. 2B and 2C are perspective views each showing the digital camera 101. This embodiment will describe, as an example of an information terminal, the digital camera 101 serving as an image pickup apparatus. The information terminal, however, is not limited to this. Note that in the digital camera 101, a side on which a release switch 205a is provided is defined as an upper side, a side on which an image pickup unit 202 is provided is defined as a front side, and a side on which a display unit 206 is defined as a rear side.

The digital camera 101 includes a control unit 201, the image pickup unit 202, a nonvolatile memory 203, a work memory 204, an operation unit 205, the display unit 206, a timer 207, a recording medium I/F 209, and a recording medium 210. The digital camera 101 further includes a communication unit 211, a power feeding unit 212, a power supply unit 213, and a power supply control unit 214. The image pickup unit 202, nonvolatile memory 203, work memory 204, operation unit 205, display unit 206, timer 207, recording medium I/F 209, communication unit 211, and power supply control unit 214 are electrically connected to the control unit 201.

The control unit 201 includes a CPU (Central Processing Unit) (not shown), and controls the respective units of the digital camera 101 by executing an input signal and a program stored in the nonvolatile memory 203. Note that instead of controlling the overall digital camera 101 by the control unit 201, a plurality of CPUs may control the overall digital camera 101 by sharing processing.

The image pickup unit 202 is provided on a front surface 101b of a housing 101a of the digital camera 101. The image pickup unit 202 includes, for example, an optical lens unit, an optical system for controlling the iris, zoom, focus, and the like, and an image sensor for converting light (video) introduced via the optical lens unit into an electrical video signal. A CMOS (Complementary Metal Oxide Semiconductor) or CCD (Charge Coupled Device) is generally used as an image sensor. Under the control of the control unit 201, the image pickup unit 202 causes the image sensor to convert, into an electrical signal, object light formed by a lens included in the image pickup unit 202, converts the electrical signal into a digital signal, performs image processing such as noise reduction processing, and outputs image data. The digital camera 101 according to this embodiment records the image data in the recording medium 210 in accordance with the DCF (Design Rule for Camera File System) standard.

The nonvolatile memory 203 is an electrically erasable and recordable memory, and stores programs to be executed by the control unit 201 and the like. The nonvolatile memory 203 stores an application for performing wireless communication with the wearable terminal 102 and the handheld terminal 103. The work memory 204 is used as a buffer memory for temporarily holding image data picked up by the image pickup unit 202, an image display memory for storing image data to be displayed on the display unit 206, a work area for the control unit 201, and the like.

The operation unit 205 includes, for example, a power button used to switch ON/OFF of the power of the digital camera 101, the release switch 205a used to instruct a pickup, and a reproduction button 205b used to instruct reproduction of image data. The operation unit 205 includes a 4-way selector 205c, and a dedicated connection button used to start communication with an external apparatus via the communication unit 211. The operation unit 205 may include, as the display unit 206, a touch panel 205d having a position input function. As described above, the operation unit 205 is used to accept, from the user, an instruction to the digital camera 101.

The release switch 205a is provided on an upper surface 101c of the housing 101a of the digital camera 101, and includes a first shutter switch SW1 and a second shutter switch SW2. When the release switch 205a is set in a so-called halfway pressed state, the first shutter switch SW1 is turned on. This causes the control unit 201 to start AF (Auto Focus) processing, AE (Auto Exposure) processing, AWB (Auto White Balance) processing, EF (flash pre-emission) processing, and the like. When the release switch 205a is set in a so-called fully pressed state, the second shutter switch SW2 is turned on. This causes the control unit 201 to perform pickup processing. The pickup processing indicates processing of reading out a signal from the image pickup unit 202, performing image processing, writing image data in the work memory 204, displaying the image data on the display unit 206, and writing the image data in the recording medium 210.

The display unit 206 is provided on a rear surface 101d of the housing 101a, and is formed by a liquid crystal display and the like. The display unit 206 displays a viewfinder image at the time of pickup, pick up image data, characters for interactive operations with the user, and the like. Note that the display unit 206 need not always be formed integrally with the digital camera 101. For example, the display unit 206 may be formed to be separated from the digital camera 101, and the display unit of an external apparatus different from the digital camera 101 may be used as the display unit 206. The digital camera 101 can be connected to the integrally formed display unit 206 or the external display unit 206, and need only include the control unit 201 for controlling display of the display unit 206. The timer 207 measures the time in various control operations or the time of an internal clock.

The recording medium I/F 209 serves as an interface with the recording medium 210. At the time of pickup, the recording medium I/F 209 reads out image data which is obtained at the time of pickup and is stored in the work memory 204, and records it in the recording medium 210 in response to an instruction signal from the control unit 201. The recording medium 210 is a recording medium such as a memory card for recording image data output from the image pickup unit 202, and is formed by a semiconductor memory, a magnetic disk, or the like. The recording medium 210 may be detachable from the digital camera 101, or may be incorporated in the digital camera 101.

The communication unit 211 serves as an interface for performing wireless communication with a communicable external apparatus. The communication unit 211 includes an interface for performing communication by so-called Bluetooth® complying with the IEEE802.15.1 standard. The control unit 201 implements wireless communication with an external apparatus by controlling the communication unit 211. The digital camera 101 according to this embodiment can transmit/receive data to/from the wearable terminal 102 and the handheld terminal 103 via the communication unit 211. For example, the digital camera 101 can transmit image data generated by the image pickup unit 202 to the wearable terminal 102 and the handheld terminal 103 via the communication unit 211. Note that the communication method is not limited to Bluetooth, and includes short distance wireless communication, for example, an infrared communication method or a wireless LAN such as Wi-Fi known in the IEEE802.11 standard.

The communication unit 211 of the digital camera 101 according to this embodiment has a peripheral mode or central mode. When the control unit 201 operates the communication unit 211 in the peripheral mode, the digital camera 101 according to this embodiment can operate as a client in Bluetooth. If the digital camera 101 operates as a client, it can perform wireless communication by performing connection to the wearable terminal 102 or the handheld terminal 103 in the central mode. Note that authentication with an external apparatus to be connected is executed by performing pairing in advance to authenticate each other, and storing, in the nonvolatile memory 203, unique information of the wearable terminal 102 and handheld terminal 103 to be connected.

The power feeding unit 212 is provided on a side surface 101e of the housing 101a of the digital camera 101, and has an antenna (not shown). When the power feeding unit 212 is brought close to a charger (not shown) within a predetermined distance, it receives a radio wave transmitted from the charger, and rectifies the received radio wave by a rectifier (not shown), thereby feeding power to the power supply unit 213. This can feed power to the power feeding unit 212 in a non-contact manner without using a cable or the like. The control unit 201 can control the start and end of power feeding. The power supply unit 213 is formed from a secondary battery and the like, and is electrically connected to the power feeding unit 212. The power supply control unit 214 is electrically connected to the power supply unit 213, includes a battery detection circuit, DC/DC converter, and a switch circuit for switching a block to be energized (none are shown), and detects the remaining capacity of the battery of the power supply unit 213. The power supply control unit 214 controls the DC/DC converter based on a command signal from the control unit 201, and supplies a necessary voltage to each unit of the digital camera 101 for a necessary time. Note that this embodiment has explained the power feeding unit 212 as a non-contact power feeding unit of a radio wave reception type. However, the power feeding unit 212 need only be a non-contact power feeding unit, and may adopt an electromagnetic induction method or resonance method.

Figure 3:
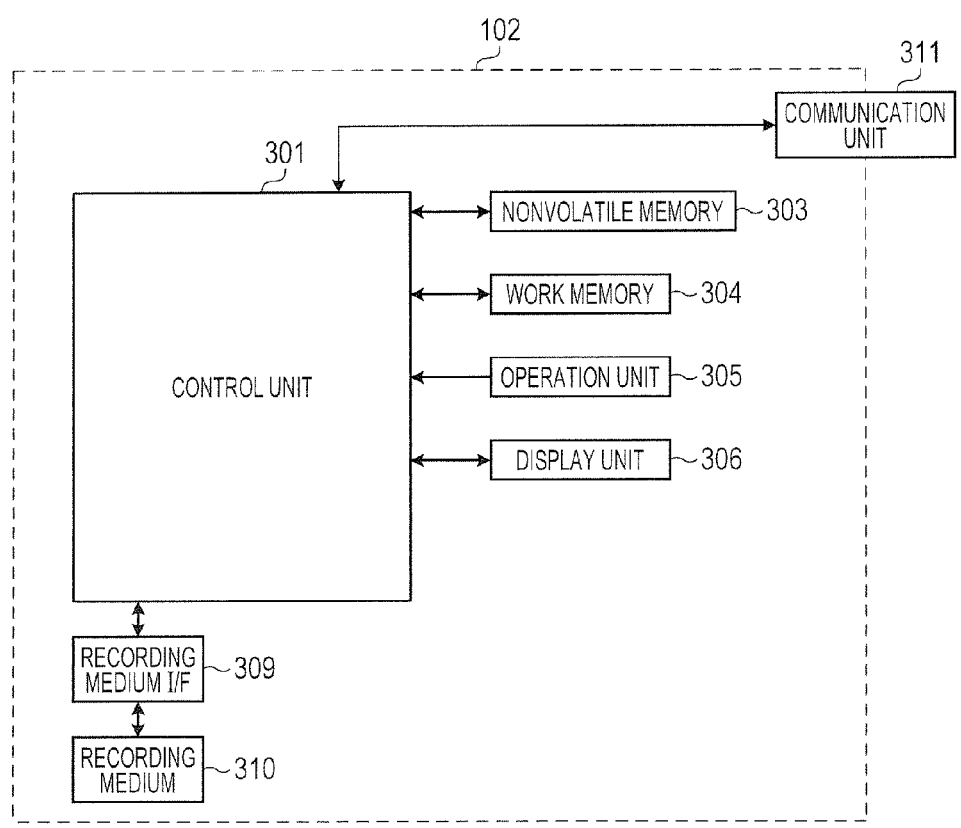
FIG. 3 is a block diagram showing the hardware arrangement of a wearable apparatus according to the first embodiment of the present invention.

FIG. 3 is a block diagram showing the hardware arrangement of the wearable terminal 102 as an example of a wireless communication terminal according to this embodiment. This embodiment will describe the wristwatch type wearable terminal 102 having a wireless function, which is called a smartwatch, as an example of a wearable wireless communication terminal which can be worn. The wearable terminal 102, however, is not limited to this. For example, the wearable terminal 102 may be glasses having a wireless function, a clinical thermometer or body composition meter having a wireless function, a helmet having a wireless function, or the like.

The wearable terminal 102 includes a control unit 301, a nonvolatile memory 303, a work memory 304, an operation unit 305, a display unit 306, a recording medium I/F 309, a recording medium 310, and a communication unit 311. The nonvolatile memory 303, work memory 304, operation unit 305, display unit 306, recording medium I/F 309, and communication unit 311 are electrically connected to the control unit 301.

The control unit 301 serving as the second event processing unit includes a CPU (Central Processing Unit) (not shown). The control unit 301 controls the respective units of the wearable terminal 102 by processing an input signal and executing a program stored in the nonvolatile memory 303. The control unit 301 performs display control by controlling the work memory 304, the display unit 306, and the like. Note that instead of controlling the overall wearable terminal 102 by the control unit 301, for example, a plurality of CPUs may control the overall wearable terminal 102 by sharing processing.

The nonvolatile memory 303 is an electrically erasable/recordable memory. The nonvolatile memory 303 stores an OS (Operating System) as basic software executed by the control unit 301, an application for implementing an application function in cooperation with the OS, programs to be executed by the control unit 301, and the like. In this embodiment, the nonvolatile memory 303 stores an application for performing wireless communication with the digital camera 101 and the handheld terminal 103. The work memory 304 is used as an image display memory for temporarily storing image data to be displayed on the display unit 306, a work area for the control unit 301, and the like.

The operation unit 305 includes, for example, a power button used by the user to instruct ON/OFF of the power of the wearable terminal 102, and an operation unit such as a touch panel which is formed in the display unit 306 and has a position input function. The operation unit 305 accepts various operations on the wearable terminal 102 from the user. The display unit 306 is formed from a liquid crystal display and the like. The display unit 306 displays image data, characters for interactive operations with the user, and the like. Note that the display unit 306 need not always be formed integrally with the wearable terminal 102. For example, the display unit 406 of the handheld terminal 103 different from the wearable terminal 102 may be used as the display unit 306. The wearable terminal 102 can be connected to the display unit 306, and need only include the control unit 301 for controlling display of the display unit 306.

The recording medium I/F 309 serves as an interface with the recording medium 310. In response to an instruction signal from the control unit 301, the recording medium I/F 309 reads out, for example, data stored in the work memory 304, and records it in the recording medium 310. The recording medium 310 is, for example, a recording medium such as a memory card for recording the data output from the work memory 304, and is implemented by a semiconductor memory or the like. The recording medium 310 can record image data received from the digital camera 101 via the communication unit 311. The recording medium 310 may be detachable from the wearable terminal 102, or may be incorporated in the wearable terminal 102.

The communication unit 311 serves as an interface for performing wireless communication with the digital camera 101 and handheld terminal 103 which are external apparatuses. The wearable terminal 102 according to this embodiment can transmit/receive data to/from the digital camera 101 and the handheld terminal 103 via the communication unit 311. In this embodiment, the communication unit 311 serves as an antenna, and the control unit 301 can perform wireless communication with the digital camera 101 and the handheld terminal 103 via the antenna. Note that the digital camera 101, handheld terminal 103, and wearable terminal 102 may perform communication by direction connection or via a relay server.

A protocol for communicating data in the wearable terminal 102 can use, for example, a Bluetooth-specific profile. Note that communication with the digital camera 101 and handheld terminal 103 in the wearable terminal 102 is not limited to this. For example, the communication unit 311 can include an infrared communication module, a wireless LAN communication module, and a wireless communication module for short distance wireless communication such as wireless USB. The wearable terminal 102 operates in a normal mode, or a sleep mode in which the power consumption is lower than that in the normal mode. In the sleep mode, the wearable terminal 102 displays no data on the display unit 306 but continues communication connection to an external apparatus by wireless communication such as Bluetooth. Thus, the wearable terminal 102 can transmit/receive data to/from the external apparatus. Furthermore, in a low battery state in which the remaining capacity of the battery is small, the wearable terminal 102 operates by suppressing the power consumption by, for example, disabling some functions. If the remaining capacity of the battery is small, the control unit 301 displays no data on the display unit 306 but it continues communication connection to an external apparatus by wireless communication, and can thus transmit/receive data to/from the external apparatus, similarly to the sleep mode.

Figure 4:
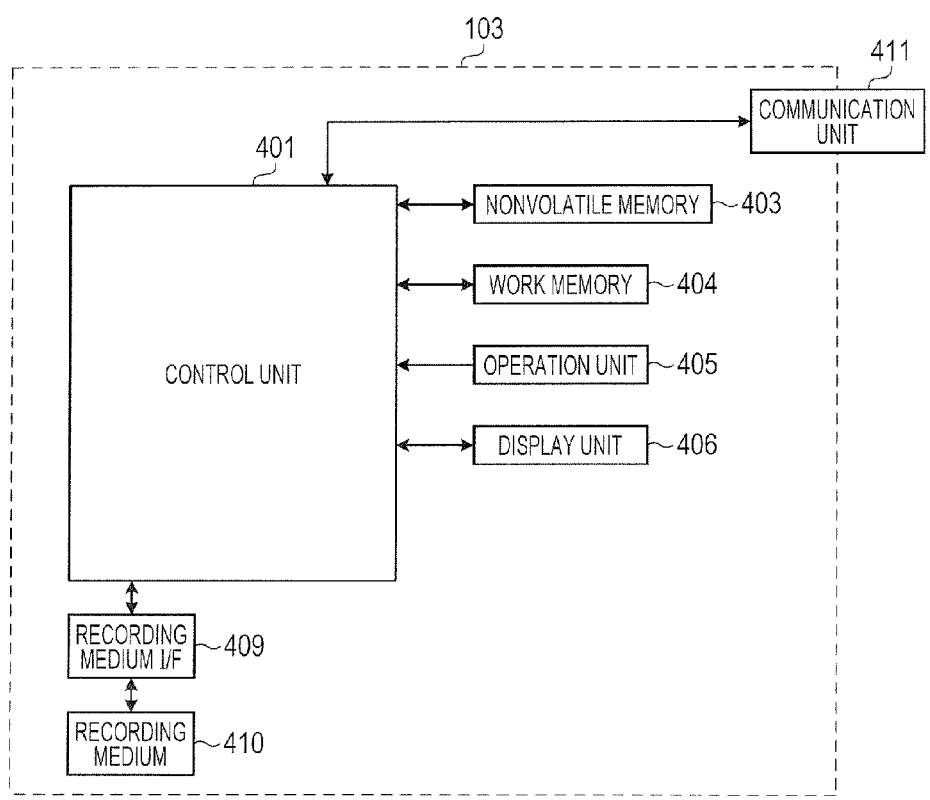
FIG. 4 is a block diagram showing the hardware arrangement of a handheld terminal according to the first embodiment of the present invention.

FIG. 4 is a block diagram showing the hardware arrangement of the handheld terminal 103 as an example of a wireless communication terminal according to this embodiment. Note that in this embodiment, the handheld terminal 103 is a smartphone, a tablet terminal, or the like. The handheld terminal 103 includes a control unit 401, a nonvolatile memory 403, a work memory 404, an operation unit 405, a display unit 406, a recording medium I/F 409, a recording medium 410, and a communication unit 411. The nonvolatile memory 403, work memory 404, operation unit 405, display unit 406, recording medium I/F 409, and communication unit 411 are electrically connected to the control unit 401.

The control unit 401 serving as the first event processing unit includes a CPU (Central Processing Unit) (not shown). The control unit 401 controls the respective units of the handheld terminal 103 by processing an input signal and executing a program stored in the nonvolatile memory 403. The control unit 401 performs display control of the display unit 406 by controlling the work memory 404, the display unit 406, and the like. Note that instead of controlling the overall handheld terminal 103 by the control unit 401, for example, a plurality of CPUs may control the overall handheld terminal 103 by sharing processing.

The nonvolatile memory 403 is an electrically erasable/recordable memory. The nonvolatile memory 403 stores an OS (Operating System) as basic software executed by the control unit 401, an application for implementing an application function in cooperation with the OS, programs to be executed by the control unit 401, and the like. In this embodiment, the nonvolatile memory 403 stores an application for performing wireless communication with the digital camera 101 and wearable terminal 102. The work memory 404 is used as an image display memory for temporarily storing image data to be displayed on the display unit 406, a work area for the control unit 401, and the like.

The operation unit 405 includes, for example, a power button used by the user to instruct ON/OFF of the power of the handheld terminal 103, and an operation unit such as a touch panel which is formed in the display unit 406 and has a position input function. The operation unit 405 accepts, from the user, an instruction to the handheld terminal 103. The display unit 406 is formed from a liquid crystal display and the like. The display unit 406 displays image data, characters for interactive operations with the user, and the like. Note that the display unit 406 need not always be formed integrally with the handheld terminal 103. The handheld terminal 103 can be connected to the display unit 406, and need only include the control unit 401 for controlling display of the display unit 406.

The recording medium I/F 409 serves as an interface with the recording medium 410. In response to an instruction signal from the control unit 401, the recording medium I/F 409 reads out, for example, data stored in the work memory 404, and records it in the recording medium 410. The recording medium 410 is, for example, a recording medium such as a memory card for recording the data output from the work memory 404, and is implemented by a semiconductor memory or the like. The digital camera 101 can record, in the recording medium 410, image data received via the communication unit 411. The recording medium 410 may be detachable from the handheld terminal 103, or may be incorporated in the handheld terminal 103.

The communication unit 411 serves as an interface for performing wireless communication with the digital camera 101 and wearable terminal 102 which are external apparatuses. The handheld terminal 103 according to this embodiment can transmit/receive, via the communication unit 411, data to/from the digital camera 101 and wearable terminal 102 which are external apparatuses. In this embodiment, the communication unit 411 serves as an antenna, and the control unit 401 can perform wireless communication with the digital camera 101 via the antenna. Note that the digital camera 101 and the wearable terminal 102 may communicate with each other by direction connection or via a relay server. For example, a Bluetooth-specific profile can be used as a protocol for communicating data in the handheld terminal 103. Note that communication between the handheld terminal 103 and the digital camera 101 or wearable terminal 102 is not limited to this. For example, the communication unit 411 can include an infrared communication module, a wireless LAN communication module, and a wireless communication module for short distance wireless communication such as wireless USB. The handheld terminal 103 operates in a normal mode, or a sleep mode in which the power consumption is lower than that in the normal mode. In the sleep mode, the handheld terminal 103 displays no data on the display unit 406 but continues communication connection to an external apparatus by wireless communication such as Bluetooth. Thus, the handheld terminal 103 can transmit/receive data to/from the external apparatus.

Figure 5:
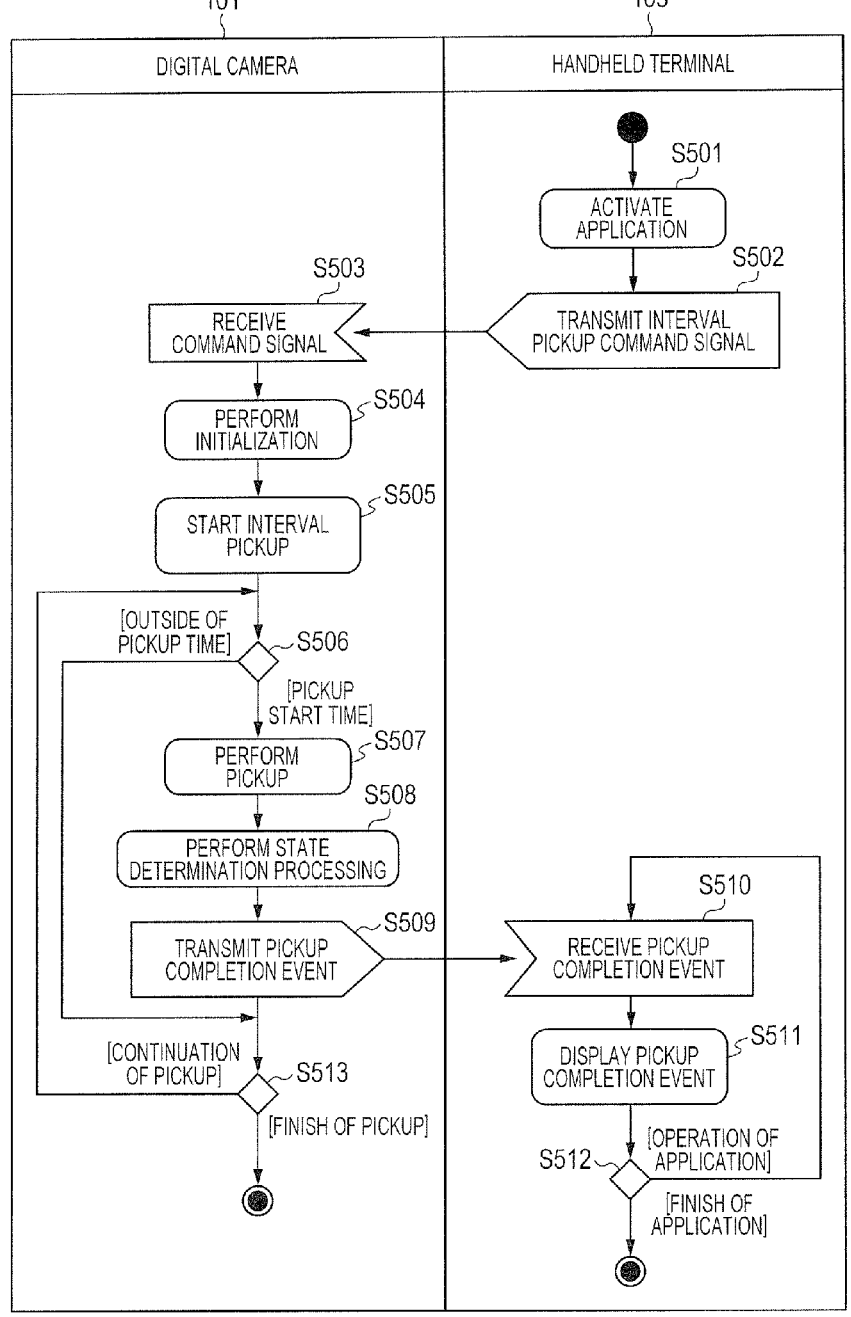
FIG. 5 is an activity chart showing processing in the information processing system according to the first embodiment of the present invention.

FIG. 5 is an activity chart for explaining the information processing system 100 according to this embodiment. Processing of remote pickup of the digital camera 101 by the handheld terminal 103 will be described with reference to FIG. 5. Assume that the digital camera 101 is powered on before the processing shown in FIG. 5. In step S501, with a user operation, the control unit 401 of the handheld terminal 103 reads out, from the nonvolatile memory 403, the application for performing wireless communication with the digital camera 101, and activates it. In step S502, the control unit 401 transmits an interval pickup command signal to the digital camera 101. In step S503, the control unit 201 of the digital camera 101 receives the interval pickup command signal. The interval pickup command signal contains information of a pickup interval, a pickup time, and the like. In step S504, the control unit 201 of the digital camera 101 initializes the digital camera 101. The initialization of the digital camera 101 indicates processing of, for example, resetting a measured elapsed time. In step S505, the control unit 201 of the digital camera 101 starts interval pickup. Interval pickup is processing of automatically performing photographing every predetermined time. When interval pickup starts, the control unit 201 measures, using the timer 207, an elapsed time after the start of the interval pickup.

In step S506, the control unit 201 of the digital camera 101 detects whether the elapsed time has reached a time set as an interval. If the elapses time reaches the time set as an interval (step S506: pickup start time), the control unit 201 determines that the pickup time is reached, and performs pickup (step S507). After completion of pickup, the control unit 201 generates a pickup completion event as event information. The pickup completion event indicates a signal representing the completion of pickup, and a processing request of a content such as a picked up image. On the other hand, if the elapsed time does not reach the time set as an interval (step S506: outside of pickup time), the control unit 201 determines that the pickup time is not reached, and performs pickup continuation determination (step S513). In step S508, after the finish of pickup, the control unit 201 of the digital camera 101 executes terminal state determination processing shown in FIG. 6. Details will be described later. Note that in this embodiment, the handheld terminal 103 is determined, in the processing in step S508, as an apparatus for executing the processing of the pickup completion event.

In step S509, the control unit 201 of the digital camera 101 transmits the pickup completion event to the handheld terminal 103 via the communication unit 211. In step S510, the control unit 401 of the handheld terminal 103 receives the pickup completion event via the communication unit 411. In step S511, the control unit 401 of the handheld terminal 103 displays, on the display unit 406 of the handheld terminal 103, a notification based on the pickup completion event. In step S512, the control unit 401 of the handheld terminal 103 determines whether to finish the application. If an application finish condition is not satisfied (step S512: operation of application), the control unit 401 of the handheld terminal 103 stands by until the pickup completion event is received; otherwise (step S512: finish of application), the control unit 401 of the handheld terminal 103 finishes the application. As the application finish condition, for example, the condition that the control unit 401 of the handheld terminal 103 transmits an interval pickup finish command signal to the digital camera 101 via the communication unit 411 is used.

In step S513, in accordance with an instruction from the handheld terminal 103, the control unit 201 of the digital camera 101 determines whether to finish the interval pickup. As an interval pickup finish condition, for example, the condition that the elapsed time after the start of the pickup reaches the pickup time is used. If the interval pickup is to be finished (step S513: finish of pickup), the control unit 201 finishes the interval pickup. If the interval pickup is to be continued (step S513: continuation of pickup), the control unit 201 stands by until the pickup time is reached.

Figure 6:
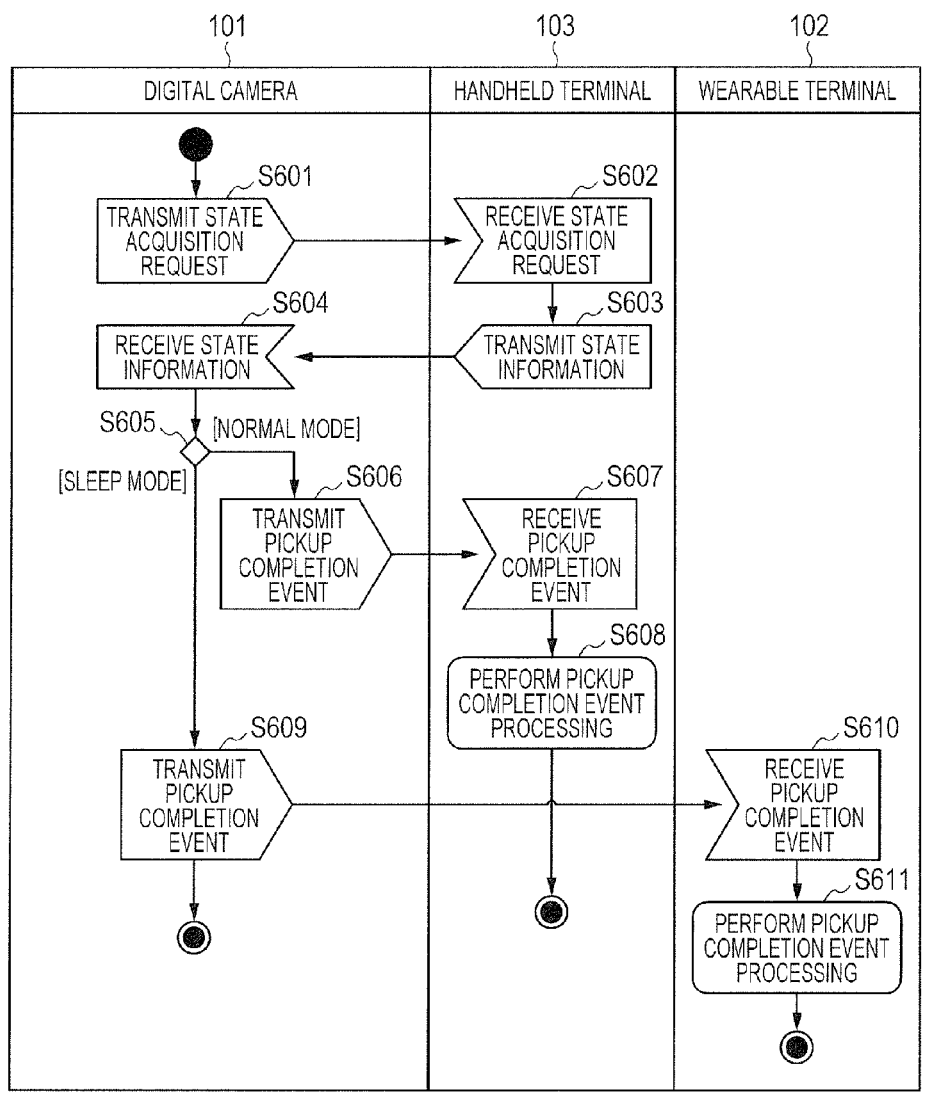
FIG. 6 is an activity chart showing processing in the information processing system according to the first embodiment of the present invention.

FIG. 6 is an activity chart showing processing in the information processing system 100 according to the embodiment of the present invention. FIG. 6 shows processes in step S508 and the subsequent steps of FIG. 5. More specifically, the processing in step S508 corresponds to steps S601 to S605, step S509 corresponds to step S606, step S510 corresponds to step S607, and steps S511 and S512 correspond to step S608. The processing of a content generated by the digital camera 101 in accordance with the situation of the user will be described with reference to FIG. 6. Before executing the processing shown in FIG. 6, the user sets the handheld terminal 103 in the sleep mode by operating a button or the like when he/she does not use the handheld terminal 103. If the user performs no operation for a predetermined time or an illuminance sensor is blocked from light for a predetermined time, the handheld terminal 103 transits to the sleep mode. The wearable terminal 102 is worn by the user, and can receive a content from the digital camera 101, and display an event indicating the reception or the like. Note that in FIG. 6, the processing executed by the digital camera 101 is implemented when the control unit 201 executes a program read out from the nonvolatile memory 203. The processing executed by the wearable terminal 102 is implemented when the control unit 301 executes the application, the program, and the like which are read out from the nonvolatile memory 303. Furthermore, the processing executed by the handheld terminal 103 is implemented when the control unit 401 executes the application, the program, and the like which are read out from the nonvolatile memory 403.

In step S601, the control unit 201 of the digital camera 101 transmits, to the handheld terminal 103 via the communication unit 211, a state acquisition request to acquire the state of the handheld terminal 103. The state of the handheld terminal 103 indicates the mode of the handheld terminal 103, which is the normal mode or sleep mode. In step S602, the control unit 401 of the handheld terminal 103 receives the state acquisition request via the communication unit 411. In step S603, the control unit 401 of the handheld terminal 103 transmits state information of the handheld terminal 103 to the digital camera 101 via the communication unit 411. In step S604, the control unit 201 of the digital camera 101 receives the state information of the handheld terminal 103 via the communication unit 211.

In step S605, the control unit 201 of the digital camera 101 determines the state of the handheld terminal 103 based on the received state information. More specifically, the control unit 201 determines whether the handheld terminal 103 can execute the processing of the pickup completion event. If the handheld terminal 103 is in the normal mode (step S605: normal mode), the control unit 201 determines that the handheld terminal 103 is in the normal mode and the user is using the handheld terminal 103. The control unit 201 of the digital camera 101 determines the handheld terminal 103 as an apparatus for executing the processing of the pickup completion event, and transmits the pickup completion event to the handheld terminal 103 (step S606).

In step S606, the control unit 201 of the digital camera 101 transmits, to the handheld terminal 103 via the communication unit 211, the pickup completion event generated by the digital camera 101. In step S607, the control unit 401 of the handheld terminal 103 receives the pickup completion event from the digital camera 101 via the communication unit 411. In step S608, the control unit 401 of the handheld terminal 103 displays, on the display unit 406, a notification based on the received pickup completion event. This displays the notification of the event on the handheld terminal 103 being used by the user, and thus the user can immediately confirm that the interval pickup has been completed. Note that the handheld terminal 103 may notify the user of the event using a vibration function, a loudspeaker, or the like (not shown).

On the other hand, if it is determined in step S605 that the handheld terminal 103 is in the sleep mode (step S605: sleep mode), the control unit 201 of the digital camera 101 determines that the user is not using the handheld terminal 103. If the handheld terminal 103 is in the sleep mode, even if the handheld terminal 103 receives the pickup completion event from the digital camera 101, it cannot notify the user of the event. The control unit 201 of the digital camera 101 determines the wearable terminal 102 as an apparatus for executing the processing of the pickup completion event. In step S609, the control unit 201 of the digital camera 101 transmits the pickup completion event to the wearable terminal 102 via the communication unit 211. In step S610, the control unit 301 of the wearable terminal 102 receives the pickup completion event from the digital camera 101 via the communication unit 311. The control unit 301 of the wearable terminal 102 displays, on the display unit 306 of the wearable terminal 102, a notification based on the event of the digital camera 101. Note that the wearable terminal 102 may notify the user of the event using a vibration function, a loudspeaker, or the like (not shown). In step S611, the control unit 301 of the wearable terminal 102 displays, on the display unit 306, a notification based on the received pickup completion event.

As described above, in accordance with the use state of the handheld terminal 103, the terminal being used by the user is notified of information based on an event generated by the digital camera 101. This can provide information to the user in an easy-to-understand manner by effectively using different kinds of terminals.

Second Embodiment

The second embodiment of the present invention will be described next. This embodiment is different from the first embodiment in that a handheld terminal 103 determines a terminal use state. The same reference numerals as those in the first embodiment denote the same components and a description thereof will be omitted.

Figure 7:
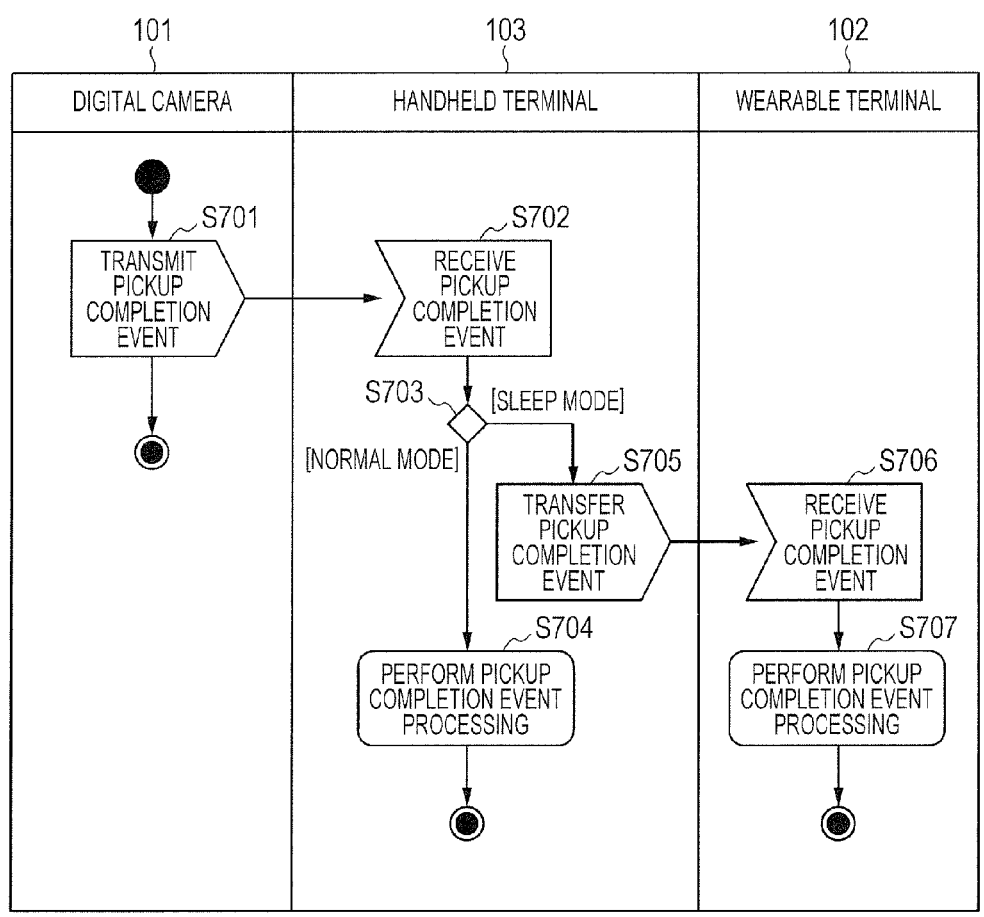
FIG. 7 is an activity chart showing processing in an information processing system according to the second embodiment of the present invention.

FIG. 7 is an activity chart showing terminal state determination processing in an information processing system 100 according to this embodiment. In step S701, after generating a pickup completion event, the digital camera 101 transmits the pickup completion event to the handheld terminal 103 via a communication unit 211. In step S702, the handheld terminal 103 receives the pickup completion event via a communication unit 411. In step S703, a control unit 401 of the handheld terminal 103 determines whether the state of itself is the sleep mode. If the handheld terminal 103 is in the normal mode (step S703: normal mode), the control unit 401 determines that the self terminal can perform the processing of the pickup completion event, and determines itself as an apparatus for executing the processing of the pickup completion event. The control unit 401 performs the processing of the pickup completion event (step S704). In step S704, the control unit 401 of the handheld terminal 103 processes the received pickup completion event, and displays, on a display unit 406 of the handheld terminal 103, a notification based on the pickup completion event.

On the other hand, if the handheld terminal 103 is in the sleep mode (step S703: sleep mode), the control unit 401 determines that the self terminal cannot process the pickup completion event from the digital camera 101. The control unit 401 of the handheld terminal 103 determines a wearable terminal 102 as an apparatus for executing the processing of the pickup completion event, and transfers the pickup completion event to the wearable terminal 102 (step S705). In step S706, the wearable terminal 102 receives the pickup completion event via a communication unit 311. In step S707, a control unit 301 of the wearable terminal 102 displays, on a display unit 306 of the wearable terminal 102, a notification based on the received pickup completion event. Note that in this embodiment, in step S703, the control unit 401 of the handheld terminal 103 determines that the self terminal cannot process the pickup completion event in the sleep mode. The state in which the pickup completion event cannot be processed is not limited to the sleep mode. For example, if the handheld terminal 103 is in a voice communication state, it may be determined that the pickup event from the digital camera 101 cannot be processed, and the pickup completion event may be transmitted to the wearable terminal 102.

As described above, in this embodiment, in accordance with the use state of the handheld terminal 103 of the user, the control unit 401 of the handheld terminal 103 processes the received pickup completion event by itself or by the wearable terminal 102. That is, since processing can be performed independently of the digital camera 101, more flexible processing can be performed.

Third Embodiment

The third embodiment of the present invention will be described next. This embodiment is different from the first embodiment in that a wearable terminal 102 determines event processing. The same reference numerals as those in the first embodiment denote the same components and a description thereof will be omitted.

Figure 8:
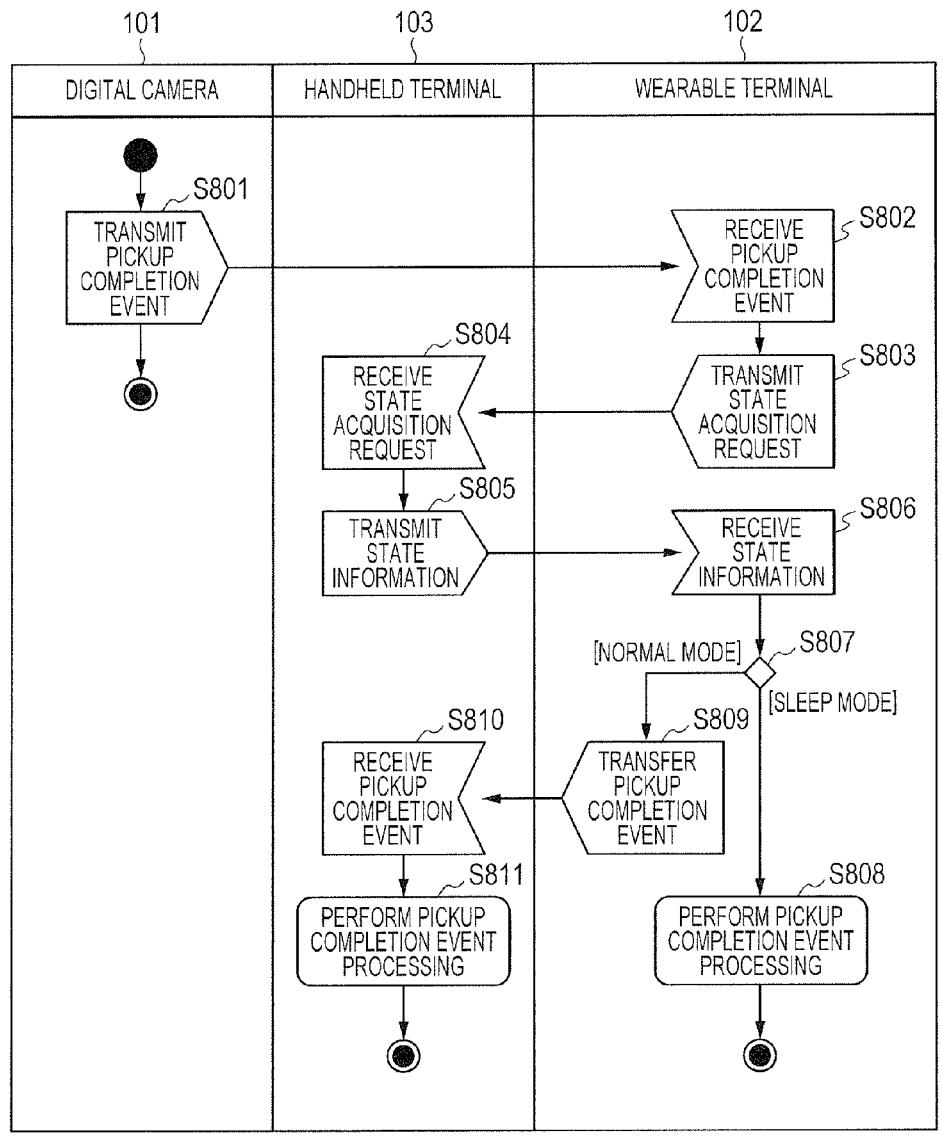
FIG. 8 is an activity chart showing processing in an information processing system according to the third embodiment of the present invention.

FIG. 8 is an activity chart showing terminal state determination processing in an information processing system 100 according to this embodiment. In step S801, after generating a pickup completion event, a control unit 201 of a digital camera 101 transmits the pickup completion event to the wearable terminal 102 via a communication unit 211. In step S802, the wearable terminal 102 receives the pickup completion event via a communication unit 311. In step S803, a control unit 301 of the wearable terminal 102 transmits a state acquisition request to a handheld terminal 103. In step S804, a control unit 401 of the handheld terminal 103 receives the state acquisition request. In step S805, the control unit 401 of the handheld terminal 103 acquires the state of itself, and transmits state information to the wearable terminal 102 via a communication unit 411. In step S806, the wearable terminal 102 receives the state information of the handheld terminal 103 via the communication unit 311. In step S807, based on the received state information of the handheld terminal 103, the control unit 301 of the wearable terminal 102 determines whether the state of the handheld terminal 103 is the sleep mode. If the handheld terminal 103 is in the sleep mode (step S807: sleep mode), the control unit 301 determines that the handheld terminal 103 cannot process the pickup completion event, and determines itself as an apparatus for executing the processing of the pickup completion event. The wearable terminal 102 processes the pickup completion event (step S808). In step S808, the control unit 301 of the wearable terminal 102 processes the pickup completion event, and displays, on a display unit 306 of the wearable terminal 102, a notification based on the pickup completion event.

On the other hand, if the state of the handheld terminal 103 is the normal mode (step S807: normal mode), the control unit 301 determines that the user is using the handheld terminal 103 and the handheld terminal 103 can process the pickup completion event. The control unit 301 determines the handheld terminal 103 as an apparatus for executing the processing of the pickup completion event, and transfers the pickup completion event to the handheld terminal 103 (step S809). In step S809, the control unit 301 of the wearable terminal 102 transfers, to the handheld terminal 103 via the communication unit 311, the pickup completion event received from the digital camera 101. In step S810, the control unit 401 of the handheld terminal 103 receives the pickup completion event via the communication unit 411. In step S811, the control unit 401 of the handheld terminal 103 displays, on a display unit 406, a notification based on the received pickup completion event.

As described above, in this embodiment, the wearable terminal 102 determines a terminal for processing the pickup completion event of the digital camera 101. This can obtain the same effects as in the second embodiment.

Fourth Embodiment

The fourth embodiment of the present invention will be described next. This embodiment is different in that each of a wearable terminal 102 and a handheld terminal 103 performs the processing of an event based on processing settings preset by the user. The same reference numerals as those in the first embodiment denote the same components and a description thereof will be omitted.

Figure 9:
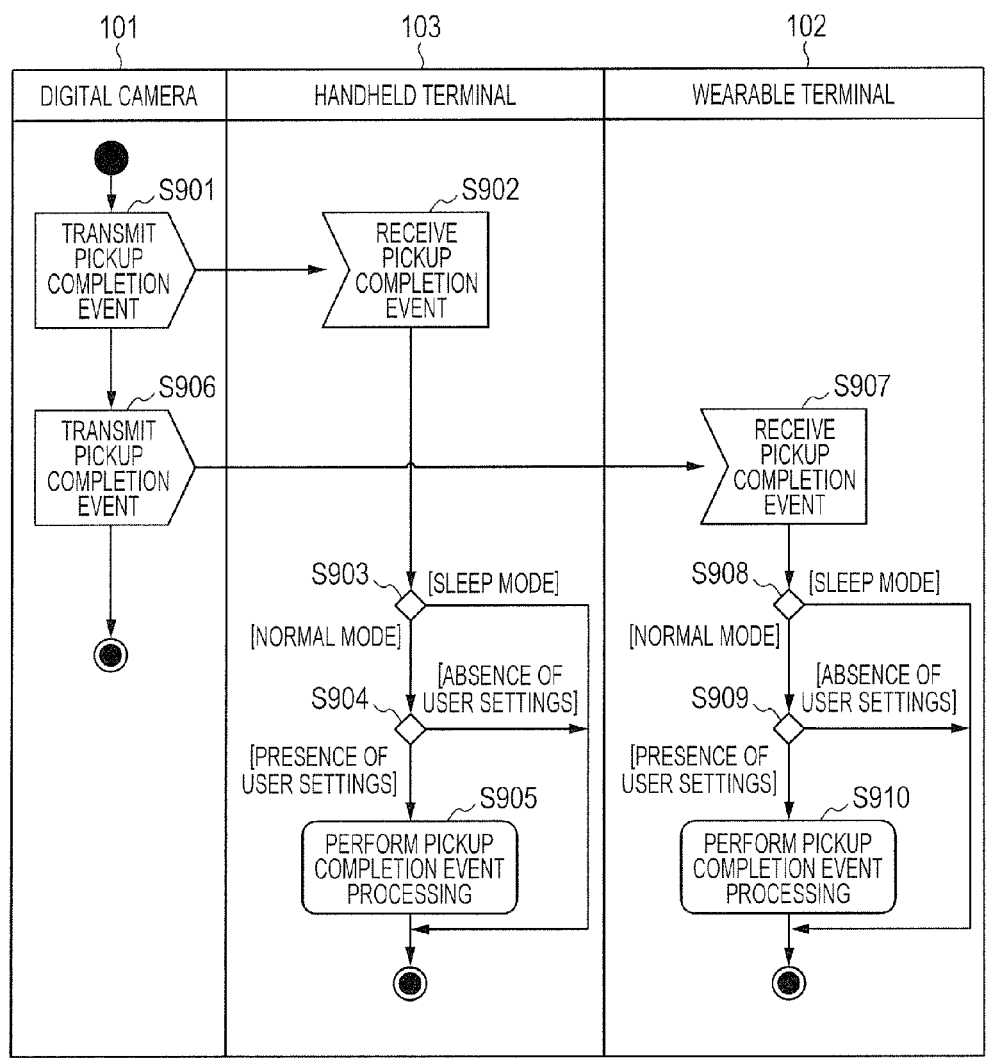
FIG. 9 is an activity chart showing processing in an information processing system according to the fourth embodiment of the present invention.

FIG. 9 is an activity chart showing terminal state determination processing in an information processing system 100 according to the embodiment of the present invention. In step S901, after generating a pickup completion event, a control unit 201 of a digital camera 101 transmits the pickup completion event to the handheld terminal 103 via a communication unit 211. In step S902, a control unit 301 of the handheld terminal 103 receives the pickup completion event via a communication unit 311. In step S903, a control unit 401 of the handheld terminal 103 determines whether the state of itself is the sleep mode. If the state of the handheld terminal 103 is the normal mode (step S903: normal mode), the control unit 401 determines the presence/absence of processing settings by the user (step S904). If the presence of processing settings is determined (step S904: presence of user settings), the control unit 401 processes the pickup completion event from the digital camera 101 in accordance with the processing settings (step S905). In step S905, the control unit 401 of the handheld terminal 103 displays, on a display unit 406 of the handheld terminal 103, a notification based on the pickup completion event in order to process the pickup completion event by itself. On the other hand, if the handheld terminal 103 is in the sleep mode (step S903: sleep mode) or the absence of the processing settings by the user is determined (step S904: absence of user settings), the control unit 401 does not process the pickup completion event by neglecting it.

After step S901, in step S906, the control unit 201 of the digital camera 101 transmits, to the wearable terminal 102 via the communication unit 211, the same event as the pickup completion event transmitted to the handheld terminal 103. In step S907, the control unit 301 of the wearable terminal 102 receives the pickup completion event. In step S908, the control unit 301 of the wearable terminal 102 determines whether the state of itself is one of the sleep mode and low battery state. If the wearable terminal 102 is in the normal mode (step S908: normal mode), the control unit 301 determines the presence/absence of processing settings by the user (step S909). If the presence of processing settings is determined (step S909: presence of user settings), the control unit 301 processes the pickup completion event from the digital camera 101 in accordance with the processing settings (step S910). In step S910, the control unit 301 of the wearable terminal 102 displays, on a display unit 306 of the wearable terminal 102, a notification based on the pickup completion event in order to process the pickup completion event. On the other hand, if the wearable terminal 102 is in the sleep mode or low battery state (step S908: sleep mode), or the absence of processing settings by the user is determined (step S909: absence of user settings), the control unit 301 does not process the pickup completion event by neglecting it.

As described above, in this embodiment, each of the wearable terminal 102 and handheld terminal 103 can process the event from the digital camera 101 independently of the digital camera 101. This can obtain the same effects as in the second embodiment.

Note that the wearable terminal 102 may include a biological detection sensor such as a heart rate sensor and temperature sensor. In this case, in step S909, if it is determined based on the detection result of the biological detection sensor that the user wears no wearable terminal 102, the control unit 301 need not process the pickup completion event. Instead of the wearing state of the user, the user may preset the detection state of the biological detection sensor in which the processing of the pickup completion event is performed. Furthermore, the processing settings are made by the user in step S904 or S909. Instead, however, processing settings may be made in each terminal by default.

Fifth Embodiment

The fifth embodiment of the present invention will be described next. In this embodiment, processing obtained by combining the first and fourth embodiments is performed. The same reference numerals as those in the first and fourth embodiments denote the same components and a description thereof will be omitted.

Figure 10:
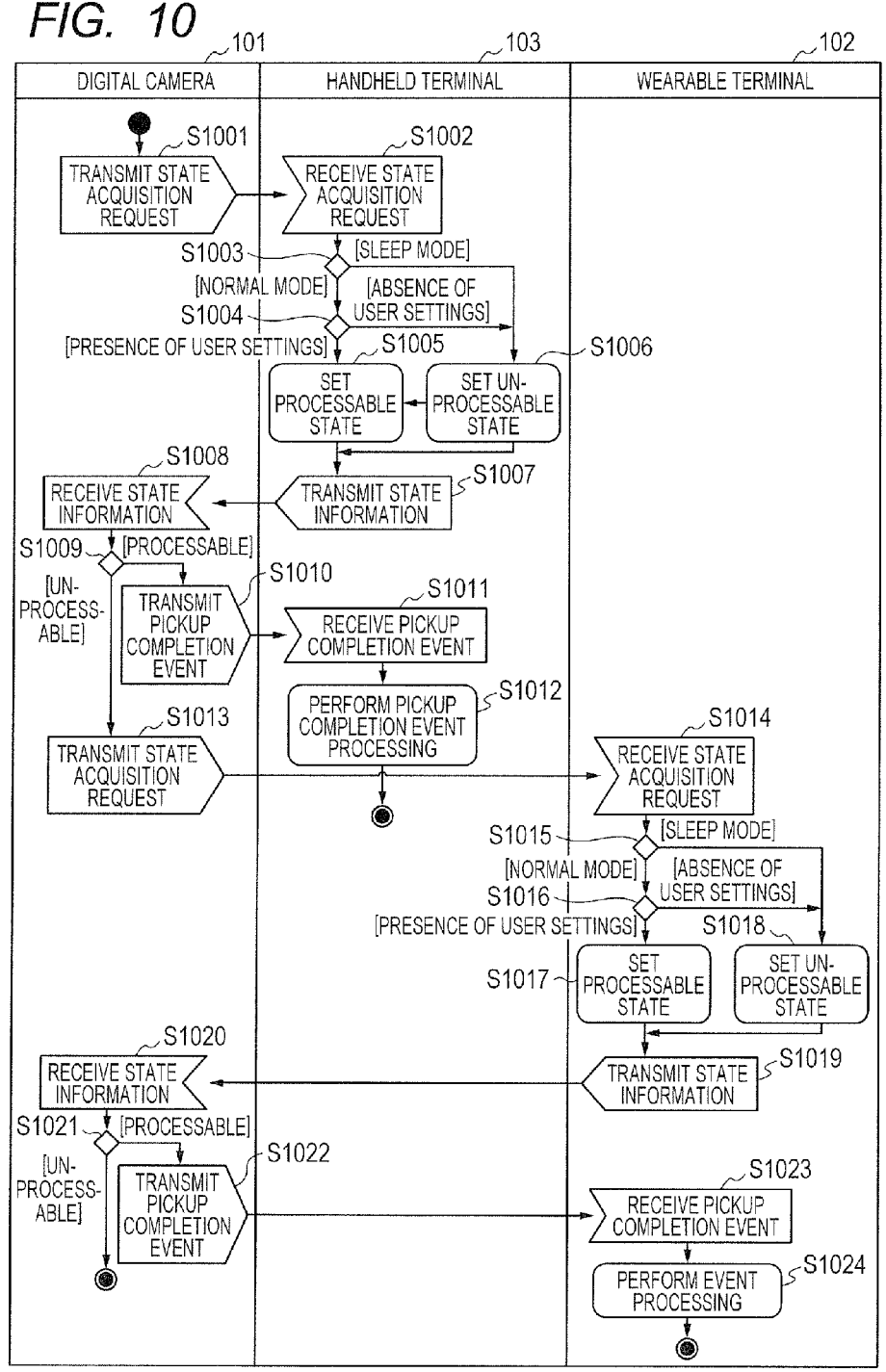
FIG. 10 is an activity chart showing processing in an information processing system according to the fifth embodiment of the present invention.

FIG. 10 is an activity chart showing terminal state determination processing in an information processing system 100 according to this embodiment. In step S1001, after generating a pickup completion event, a control unit 201 of a digital camera 101 transmits a state acquisition request to a handheld terminal 103 via a communication unit 211. In step S1002, a control unit 401 of the handheld terminal 103 receives the state acquisition request via a communication unit 411. In step S1003, the control unit 401 of the handheld terminal 103 determines whether the state of itself is the sleep mode. If the state of the handheld terminal 103 is the normal mode (step S1003: normal mode), processing settings by the user are determined (step S1004). In step S1004, the control unit 401 of the handheld terminal 103 determines the presence/absence of processing settings set by the user. If the presence of processing settings is determined (step S1004: presence of user settings), the control unit 401 determines that the processing of the pickup completion event can be performed in accordance with the processing settings set by the user, and sets a processable state as state information of itself (step S1005).

On the other hand, if the handheld terminal 103 is in the sleep mode (step S1003: sleep mode) or the absence of processing settings is determined (step S1004: absence of user settings), the control unit 401 determines that the processing of the pickup completion event cannot be performed, and sets state information. In step S1006, the control unit 401 of the handheld terminal 103 sets unprocessable state as state information of itself. In step S1007, the control unit 401 of the handheld terminal 103 transmits the state information set in step S1005 or S1006 to the digital camera 101 via the communication unit 411. In step S1008, the control unit 201 of the digital camera 101 receives the state information from the handheld terminal 103 via the communication unit 211. In step S1009, based on the state information received from the handheld terminal 103, the control unit 201 of the digital camera 101 determines whether the handheld terminal 103 can process the pickup completion event generated by the digital camera 101. If the handheld terminal 103 can process the pickup completion event (step S1009: processable), the control unit 201 determines the handheld terminal 103 as an apparatus for executing the processing of the pickup completion event. The control unit 201 transmits the pickup completion event to the handheld terminal 103 (step S1010). In step S1011, the control unit 401 of the handheld terminal 103 receives the pickup completion event via the communication unit 411. In step S1012, the control unit 401 of the handheld terminal 103 displays, on a display unit 406 of the handheld terminal 103, a notification based on the pickup completion event in order to process the pickup completion event.

On the other hand, if the handheld terminal 103 cannot process the pickup completion event (step S1009: unprocessable), the control unit 201 of the digital camera 101 determines a wearable terminal 102 as an apparatus for executing the processing of the pickup completion event. The control unit 201 transmits a state acquisition request to the wearable terminal 102 (step S1013). In step S1014, a control unit 301 of the wearable terminal 102 receives the state acquisition request via a communication unit 311. In step S1015, the control unit 301 of the wearable terminal 102 determines whether the state of itself is the sleep mode. If the wearable terminal 102 is in the normal mode (step S1015: normal mode), the control unit 301 determines that the user is using the wearable terminal 102, and determines processing settings by the user (step S1016). In step S1016, the control unit 301 of the wearable terminal 102 determines the presence/absence of processing settings by the user with respect to the processing of the pickup completion event from the digital camera 101. If the presence of processing settings is determined (step S1016: presence of user settings), the control unit 301 sets a processable state as state information of the wearable terminal 102 (step S1017). On the other hand, if the wearable terminal 102 is in the sleep mode (step S1015: sleep mode) or the absence of processing settings is determined (step S1016: absence of user settings), the control unit 301 determines that it cannot process the pickup completion event, and sets state information. In step S1018, the control unit 301 of the wearable terminal 102 sets an unprocessable state as state information of itself. In step S1019, the control unit 301 of the wearable terminal 102 transmits the state information to the digital camera 101 via the communication unit 311.

In step S1020, the control unit 201 of the digital camera 101 receives the state information from the wearable terminal 102 via the communication unit 211. In step S1021, the control unit 201 of the digital camera 101 determines whether the wearable terminal 102 can process the pickup completion event generated by the digital camera 101. If the wearable terminal 102 can process the pickup completion event (step S1021: processable), the control unit 201 determines that the user is using the wearable terminal 102, and determines the wearable terminal 102 as an apparatus for executing the processing of the pickup completion event. The control unit 201 of the digital camera 101 transmits the pickup completion event to the wearable terminal 102 via the communication unit 211 (step S1022). If the wearable terminal 102 cannot process the pickup completion event (step S1021: unprocessable), the control unit 201 determines that the user is not using the wearable terminal 102, thereby finishing the process. In step S1023, the control unit 301 of the wearable terminal 102 receives the pickup completion event from the digital camera 101 via the communication unit 311. In step S1024, the control unit 301 of the wearable terminal 102 displays the received pickup completion event on the display unit 306 of the wearable terminal 102.

As described above, in this embodiment, it is possible to provide information to the user in an easy-to-understand manner in accordance with the use situations of the wearable terminal 102 and handheld terminal 103.

Sixth Embodiment

The sixth embodiment of the present invention will be described next. This embodiment is different from the first embodiment in that the recording/reproduction apparatus of a digital television is used instead of the digital camera. The same reference numerals as those in the first embodiment denote the same components and a description thereof will be omitted.

Figure 11A:
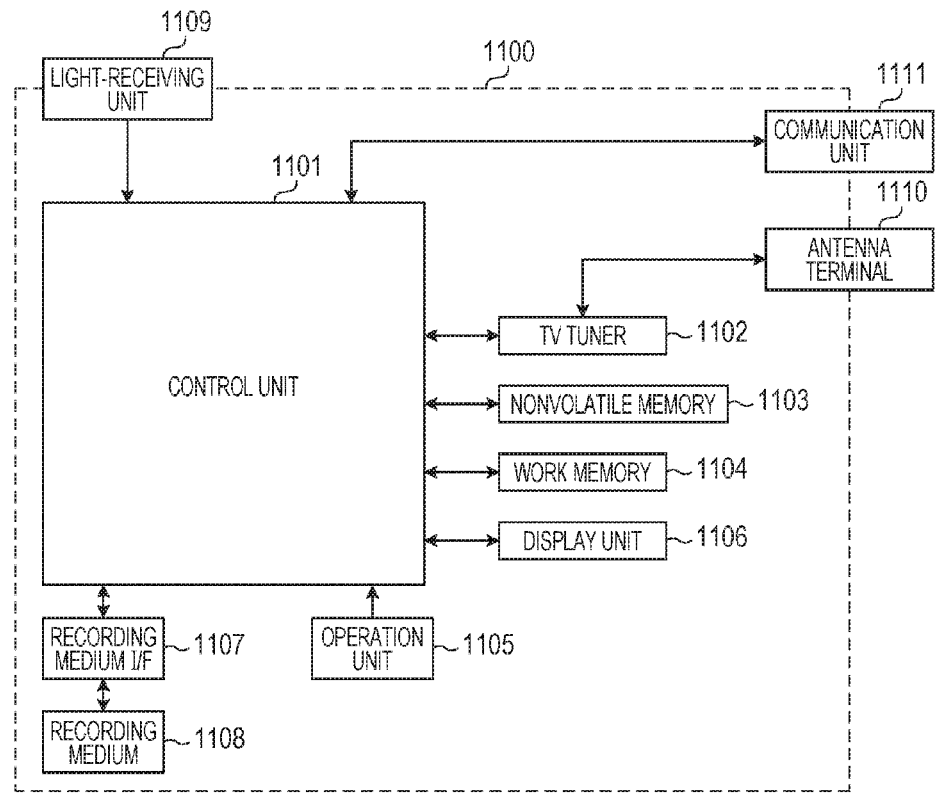
FIGS. 11A and 11B are a block diagram and a perspective view, respectively, showing the hardware arrangement of a recording/reproduction apparatus according to the sixth embodiment of the present invention.
Figure 11B:
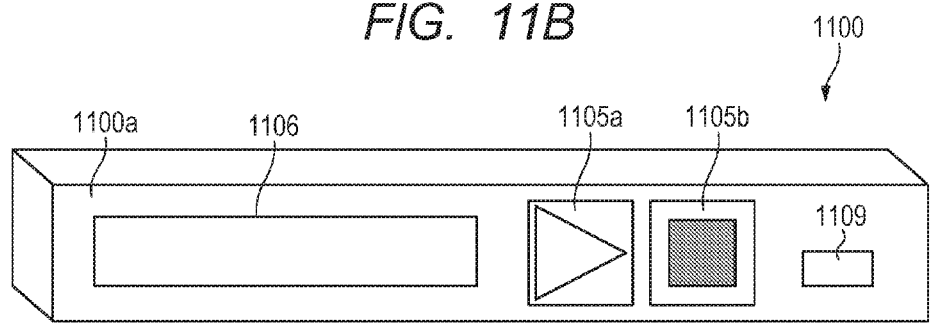

FIGS. 11A and 11B are a block diagram and a perspective view, respectively, showing the hardware arrangement of a recording/reproduction apparatus 1100 according to this embodiment. FIG. 11A is a block diagram showing the hardware arrangement of the recording/reproduction apparatus 1100 of a digital television as an example of an information providing terminal according to this embodiment. FIG. 11B is a perspective view showing the recording/reproduction apparatus 1100. Note that in FIG. 11B, a side on which a display unit 1106 is arranged is defined as a front side.

The recording/reproduction apparatus 1100 includes a control unit 1101, a TV tuner 1102, a nonvolatile memory 1103, a work memory 1104, an operation unit 1105, a display unit 1106, a recording medium I/F 1107, and a recording medium 1108. The recording/reproduction apparatus 1100 further includes a light-receiving unit 1109, an antenna terminal 1110, and a communication unit 1111. The TV tuner 1102, nonvolatile memory 1103, work memory 1104, operation unit 1105, display unit 1106, recording medium I/F 1107, light-receiving unit 1109, and communication unit 1111 are electrically connected to the control unit 1101.

The control unit 1101 includes a CPU (Central Processing Unit) (not shown), and controls the respective units of the recording/reproduction apparatus 1100 by processing an input signal and executing a program stored in the nonvolatile memory 1103. The control unit 1101 controls display of the display unit 1106. Note that instead of controlling the overall recording/reproduction apparatus 1100 by the control unit 1101, for example, a plurality of CPUs may control the overall recording/reproduction apparatus 1100 by sharing processing. The control unit 1101 has a function of acquiring time information from, for example, time information contained in a television radio wave signal.

The TV tuner 1102 is electrically connected to the antenna terminal 1110, and receives a television radio wave signal via an external antenna and extracts a signal of a desired channel by modulation. The extracted signal undergoes signal processing by the control unit 1101 to be converted into a TV video signal, and is then recorded in the recording medium 1108. The nonvolatile memory 1103 is an electrically erasable/recordable memory. The nonvolatile memory 1103 stores an OS (Operating System) as basic software executed by the control unit 1101, an application for implementing an application function in cooperation with the OS, programs to be executed by the control unit 1101, and the like. In this embodiment, the nonvolatile memory 1103 stores an application for performing wireless communication with a wearable terminal 102 and a handheld terminal 103. The work memory 1104 is used as a work area for the control unit 1101 and the like.

The operation unit 1105 is provided on a front surface 1100*a* of the recording/reproduction apparatus 1100. The operation unit 1105 includes, for example, a power button used to instruct ON/OFF of the power of the recording/reproduction apparatus 1100, a reproduction button 1105*a* used to reproduce recording data, a recording button 1105*b* used to start recoding, a button used to stop recording, and a button used to make a recording reservation. The operation unit 1105 further includes a connection button used to communicate with an external apparatus via the communication unit 1111, and a remote controller such as a touch panel having a function of acquiring position information. The operation unit 1105 is used to accept, from the user, an instruction to the recording/reproduction apparatus 1100.

The display unit 1106 is provided on the front surface 1100*a* of the recording/reproduction apparatus 1100. The display unit 1106 is formed from, for example, a liquid crystal display and the like. The display unit 1106 displays various settings and information of the recording/reproduction apparatus 1100 and the like. The recording medium I/F 1107 serves as an interface with the recording medium 1108. In response to an instruction signal from the control unit 1101, the recording medium I/F 1107 records the converted TV video signal. The recording medium 1108 is, for example, an HDD (Hard Disk Drive). The light-receiving unit 1109 is an infrared light-receiving unit or the like, and receives a signal from, for example, an infrared remote controller (not shown).

The communication unit 1111 serves as an interface for performing wireless communication with a communicable external apparatus. The communication unit 1111 uses a so-called wireless LAN complying with the IEEE802.11 standard with the external apparatus. In the recording/reproduction apparatus 1100 according to this embodiment, the control unit 1101 can transmit/receive data to/from the wearable terminal 102 and the handheld terminal 103 via the communication unit 1111. For example, the control unit 1101 can transmit recording data recorded in the recording medium 1108 to the wearable terminal 102 or the handheld terminal 103 via the communication unit 1111. An external apparatus such as the wearable terminal 102 or the handheld terminal 103 can perform a remote operation of the recording/reproduction apparatus 1100 via the communication unit 1111. For example, by connecting the communication unit 1111 to the external Internet and making a setting to be accessible from the outside of a home LAN, the user can make a recording reservation in the recording/reproduction apparatus 1100 in home from the handheld terminal 103 when he/she is away from home.

FIG. 12 is an activity chart showing processing in the information processing system according to this embodiment. The processing shown in FIG. 12 is processing in which the handheld terminal 103 remotely operates the recording/reproduction apparatus 1100. Assume that the recording/reproduction apparatus 1100 is powered on before performing the processing shown in FIG. 12. In step S1201, if an operation instruction to activate an application for remotely operating the recording/reproduction apparatus 1100 is issued by a user operation, a control unit 401 of the handheld terminal 103 reads out the application from a nonvolatile memory 403 and activates it. In step S1202, the control unit 401 of the handheld terminal 103 transmits a remote operation command signal of the recording/reproduction apparatus 1100 from the application activated in step S1201 to the recording/reproduction apparatus 1100 via a communication unit 411. In step S1203, the control unit 1101 of the recording/reproduction apparatus 1100 receives the remote operation command signal from the handheld terminal 103 via the communication unit 1111. In step S1204, the control unit 1101 of the recording/reproduction apparatus 1100 initializes the recording/reproduction apparatus 1100.

In step S1205, the control unit 1101 of the recording/reproduction apparatus 1100 detects whether the time has reached a preset recording start time. If the time has reached the recording start time (step S1205: recording start time), the control unit 1101 records, in the recording medium 1108, data of a TV program reserved to be recorded (step S1206). On the other hand, if the time has not reached the recording start time (step S1205: outside of recording start time), the control unit 1101 determines the presence/absence of another recording reservation (step S1212). In step S1207, after the finish of recording, the control unit 1101 of the recording/reproduction apparatus 1100 performs state determination processing of a terminal for executing processing. A difference is that the digital camera 101 shown in FIG. 6 is replaced by the recording/reproduction apparatus 1100, and the processing is the same as that in FIG. 6. Thus, a detailed description thereof will be omitted. Note that in this embodiment, the handheld terminal 103 is determined as an apparatus for executing the processing of a recording completion event in the state determination processing in step S1207.

In step S1208, the control unit 1101 of the recording/reproduction apparatus 1100 transmits, to the handheld terminal 103 via the communication unit 1111, the recording completion event as event information generated upon completion of recording in the control unit 1101. In step S1209, the control unit 401 of the handheld terminal 103 receives the recording completion event via the communication unit 411. In step S1210, the control unit 401 of the handheld terminal 103 displays, on a display unit 406, a notification based on the recording completion event. In step S1211, the control unit 401 of the handheld terminal 103 determines whether to finish the application. If an application finish condition is not satisfied (step S1211: operation of application), the control unit 401 stands by until the recording completion event is received (step S1209); otherwise (step S1211: finish of application), the control unit 401 finishes the application. Note that the application finish condition is, for example, an application finish operation by the user or the like.

After transmitting the event in step S1208, in step S1212, the control unit 1101 of the recording/reproduction apparatus 1100 determines the presence/absence of another recording reservation. If the presence of another recording reservation is determined (step S1212: presence of recording reservation), the control unit 1101 stands by until the recording start time is reached (step S1205); otherwise (step S1212: absence of recording reservation), the control unit 1101 finishes the process.

As described above, in this embodiment, based on the use states of the wearable terminal 102 and handheld terminal 103, the recording completion event of the recording/reproduction apparatus 1100 is transmitted to the terminal being used by the user. Thus, it is possible to obtain the same effects as in the first embodiment.

The embodiments of the present invention have been described above. The present invention, however, is not limited to the above-described embodiments, and various changes can be made without departing from the spirit and scope of the present invention. For example, each of the above-described embodiments has explained a case in which the information processing system 100 includes one wearable terminal 102 and one handheld terminal 103. The numbers of terminals are not necessarily one. A plurality of wearable terminals 102 and a plurality of handheld terminals 103 may be included. In this case, the processes of the wearable terminal 102 and handheld terminal 103 which have been described in each embodiment are executed for the number of wearable terminals 102 and the number of handheld terminals 103, respectively.

In each embodiment, if the handheld terminal 103 is in the sleep mode, it is determined that the control unit 301 cannot process the pickup completion event from the digital camera 101. However, the unprocessable state is not limited to the sleep mode. For example, if the handheld terminal 103 is in the voice communication state, it may be determined that the control unit 301 of the handheld terminal 103 cannot process the pickup completion event from the digital camera 101, and the above-described processing can be used intact. In the first to fourth embodiments, the pickup completion event of the digital camera 101 is transmitted to each terminal. However, an event generated by the digital camera 101 is not limited to the pickup completion event.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-148751, filed Jul. 28, 2015, which is hereby incorporated by reference wherein in its entirety.

What is claimed is:

1. An information processing system comprising:
an image pickup apparatus;
a handheld apparatus wirelessly communicable with the image pickup apparatus; and
a wearable apparatus wirelessly communicable with the handheld apparatus,
wherein the image pickup apparatus comprises:
a processor; and
a memory storing a program which, when executed by the processor, causes the image pickup apparatus to:
receive a pickup instruction from the handheld apparatus,
execute image pickup processing in response to the pickup instruction, and
transmit event information about the image pickup processing to the handheld apparatus,
wherein the handheld apparatus comprises:
a processor; and
a memory storing a program which, when executed by the processor, causes the image handheld apparatus to:

transmit the pickup instruction to the image pickup apparatus,
set one of a plurality of operation modes to operate in accordance with the set operation mode,
receive the event information from the image pickup apparatus,
selectively transfer the event information to the wearable apparatus in accordance with the set operation mode at the time of receiving the event information, and
execute processing corresponding to the event information if the event information is not transferred to the wearable apparatus, and
wherein the wearable apparatus comprises:
a processor; and
a memory storing a program which, when executed by the processor, causes the image wearable apparatus to:
receive the event information from the handheld apparatus, and
execute processing corresponding to the event information if the event information is received,
wherein the handheld apparatus displays the event information on a first display unit, and sets one of at least two operation modes in which display modes on the first display unit are different from each other, and
the wearable apparatus displays the event information on a second display unit, and sets one of at least two operation modes in which display modes on the second display unit are different from each other.

2. The information processing system according to claim 1, wherein the event information is information indicating a finish of the image pickup processing by the image pickup apparatus.

3. The information processing system according to claim 1, wherein
the handheld apparatus is caused to execute a predetermined application program to transmit the pickup instruction to the image pickup apparatus, and
the processing executed by the handheld apparatus in correspondence with the event information is processing of finishing the application program.

4. The information processing system according to claim 1, wherein
the image pickup processing is interval pickup of automatically performing photographing every predetermined time,
the pickup instruction includes a pickup time interval and a pickup period, and
when an elapsed time after start of the interval pickup reaches the pickup period, the image pickup apparatus transmits the event information to the handheld apparatus.

5. The information processing system according to claim 1, wherein the processing executed in correspondence with the event information is display processing.

6. The information processing system according to claim 1, wherein communication between the image pickup apparatus and the handheld apparatus and communication between the handheld apparatus and the wearable apparatus are performed using different communication protocols.

7. The information processing system according to claim 1, wherein
the image pickup apparatus and the handheld apparatus communicate with each other using Wi-Fi, and the handheld apparatus and the wearable apparatus communicate with each other using Bluetooth.

8. The information processing system according to claim 1, wherein
the handheld apparatus sets one of at least two operation modes in which power consumptions are different from each other.

9. The information processing system according to claim 1, wherein the handheld apparatus is communicable with each of the image pickup apparatus and the wearable apparatus if any of the plurality of operation modes is set.

10. The information processing system according to claim 1, wherein when the event information is received from the image pickup apparatus, the handheld apparatus determines the operation mode of the handheld apparatus.

11. A handheld apparatus communicable with each of an image pickup apparatus and a wearable apparatus, comprising:
a processor; and
a memory configured to store a program which, when executed by the processor, causes the handheld apparatus to:
transmit a pickup instruction to the image pickup apparatus,
receive, in response to the pickup instruction, event information about image pickup processing executed by the image pickup apparatus from the image pickup apparatus,
set one of a plurality of operation modes to operate in accordance with the set operation mode,
receive the event information from the image pickup apparatus,
selectively transfer the event information to the wearable apparatus in accordance with the set operation mode at the time of receiving the event information, and
control, if the event information is not transferred to the wearable apparatus, to execute processing corresponding to the event information, and if the event information is transferred to the wearable apparatus, not to execute the processing corresponding to the event information,
wherein one of at least two operation modes in which display modes on a display unit are different from each other is set.

12. The handheld apparatus according to claim 11, wherein the event information is information indicating a finish of the image pickup processing by the image pickup apparatus.

13. The handheld apparatus according to claim 11, wherein
the pickup instruction is transmitted by executing a predetermined application program, and
the processing executed in correspondence with the event information is processing of finishing the application program.

14. The handheld apparatus according to claim 11, wherein
the image pickup processing is interval pickup of automatically performing pickup every predetermined time,
the pickup instruction includes a pickup time interval and a pickup period, and
when an elapsed time after start of the interval pickup reaches the pickup period, the event information is transmitted from the image pickup apparatus.

15. The handheld apparatus according to claim 11, wherein the processing executed in correspondence with the event information is display processing.

16. The handheld apparatus according to claim 11, wherein
communication with the image pickup apparatus and communication with the wearable apparatus are performed using different communication protocols.

17. The handheld apparatus according to claim 11, wherein
communication with the image pickup apparatus is performed using Wi-Fi, and communication with the wearable apparatus is performed using Bluetooth.

18. The handheld apparatus according to claim 11, wherein
one of at least two operation modes in which power consumptions are different from each other is set.

19. The handheld apparatus according to claim 11, wherein
if any of the plurality of operation modes is set, communication with each of the image pickup apparatus and the wearable apparatus is possible.

20. The handheld apparatus according to claim 11, wherein
when the event information is received, the operation mode of the handheld apparatus is determined.

21. A control method for a handheld apparatus communicable with each of an image pickup apparatus and a wearable apparatus, comprising:
transmitting a pickup instruction to the image pickup apparatus;
receiving, in response to the pickup instruction, event information about image pickup processing executed by the image pickup apparatus from the image pickup apparatus;
setting one of a plurality of operation modes to operate the handheld apparatus in accordance with the set operation mode;
receiving the event information from the image pickup apparatus;
selectively transferring the event information to the wearable apparatus in accordance with the set operation mode at the time of receiving the event information; and
controlling, if the event information is not transferred to the wearable apparatus, to execute processing corresponding to the event information, and if the event information is transferred to the wearable apparatus, not to execute the processing corresponding to the event information,
wherein one of at least two operation modes in which display modes on a display unit are different from each other is set.

22. A non-transitory computer-readable storage medium storing a program for causing a computer to execute a control method for a handheld apparatus communicable with each of an image pickup apparatus and a wearable apparatus, the method comprising:
transmitting a pickup instruction to the image pickup apparatus;
receiving, in response to the pickup instruction, event information about image pickup processing executed by the image pickup apparatus from the image pickup apparatus;
setting one of a plurality of operation modes to operate the handheld apparatus in accordance with the set operation mode;
receiving the event information from the image pickup apparatus;
selectively transferring the event information to the wearable apparatus in accordance with the set operation mode at the time of receiving the event information; and
controlling, if the event information is not transferred to the wearable apparatus, to execute processing corresponding to the event information, and if the event information is transferred to the wearable apparatus, not to execute the processing corresponding to the event information,
wherein one of at least two operation modes in which display modes on a display unit are different from each other is set.

* * * * *